Feb. 27, 1962  G. A. LYON  3,022,567
METHOD OF MAKING SHELLS
Filed April 26, 1955  5 Sheets-Sheet 1

Inventor
George Albert Lyon

Feb. 27, 1962 G. A. LYON 3,022,567
METHOD OF MAKING SHELLS
Filed April 26, 1955 5 Sheets-Sheet 2
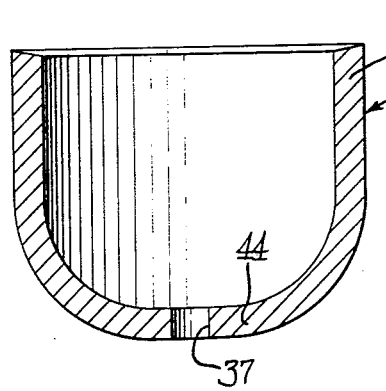
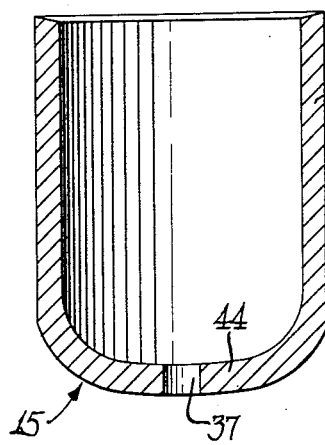
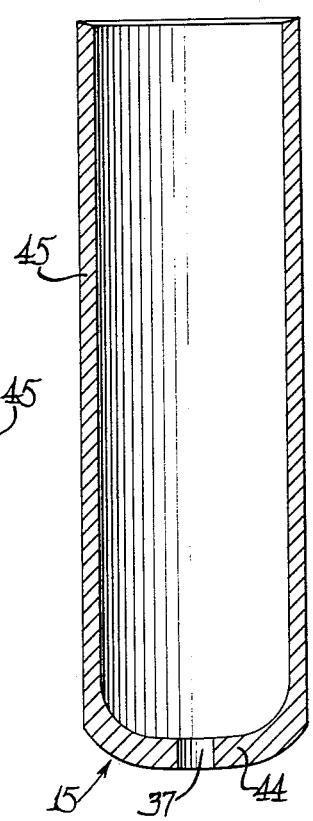
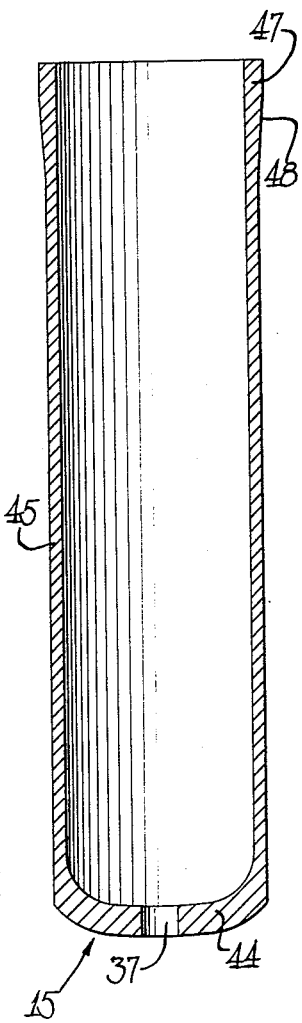
Inventor
George Albert Lyon

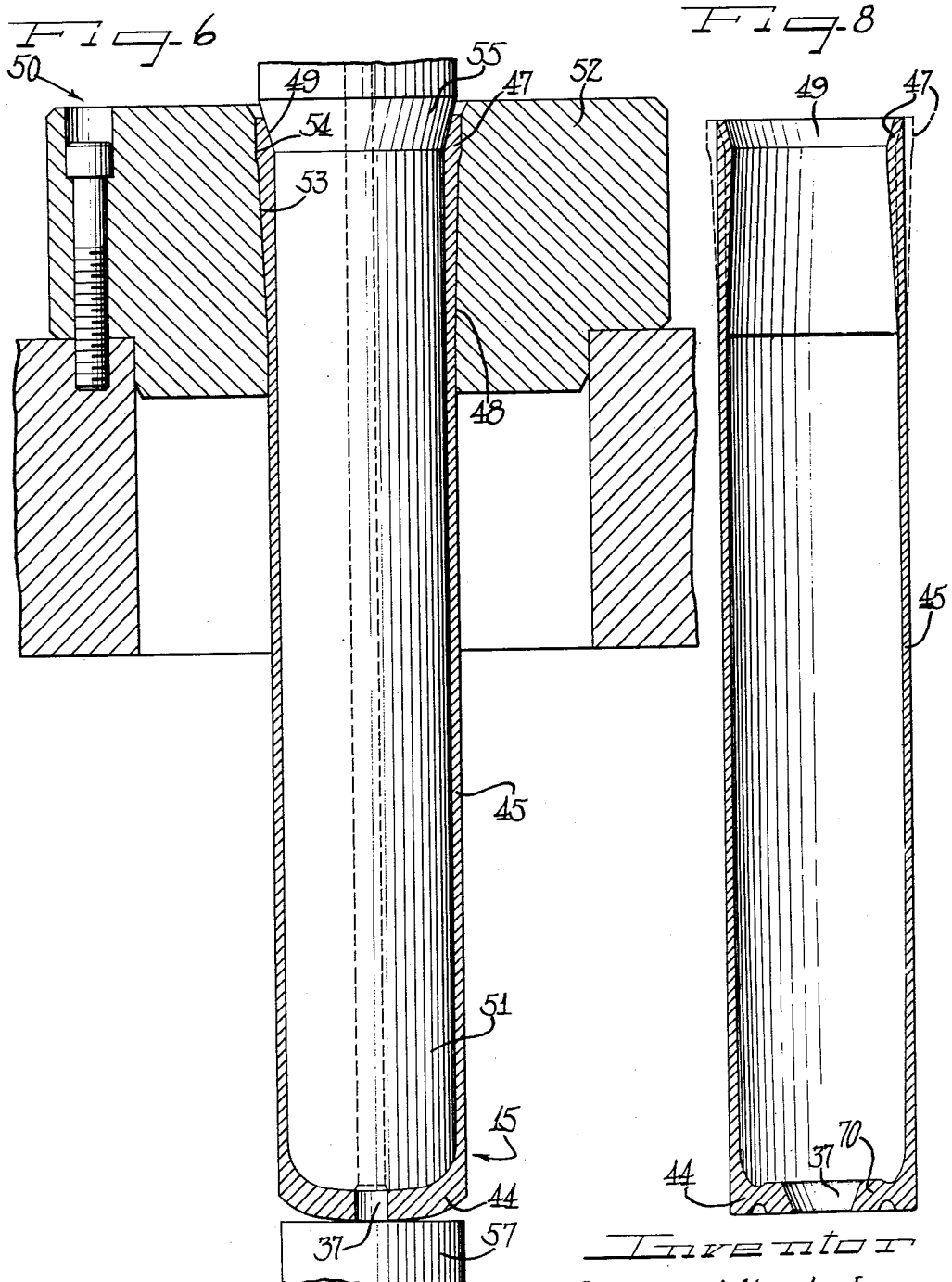

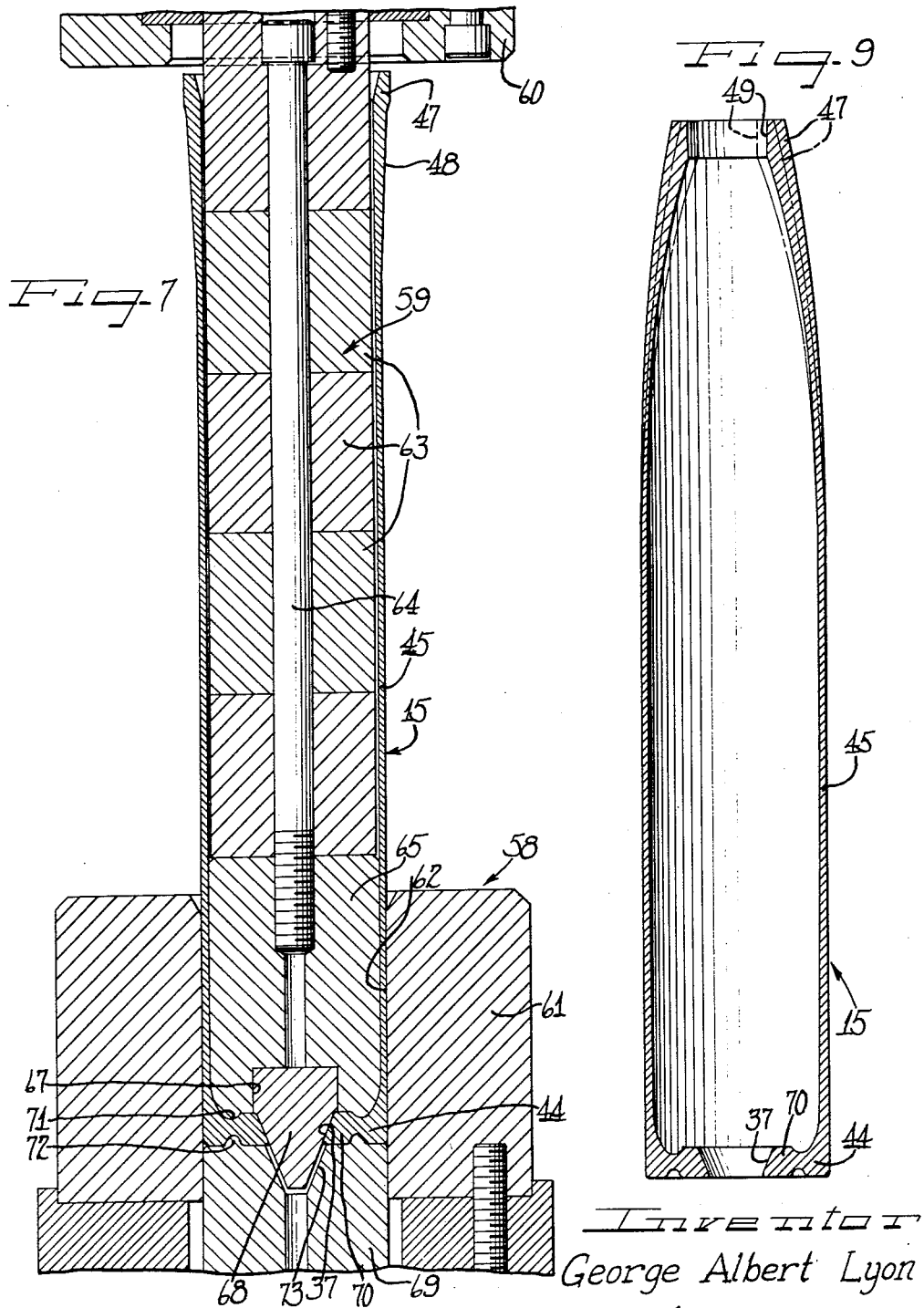

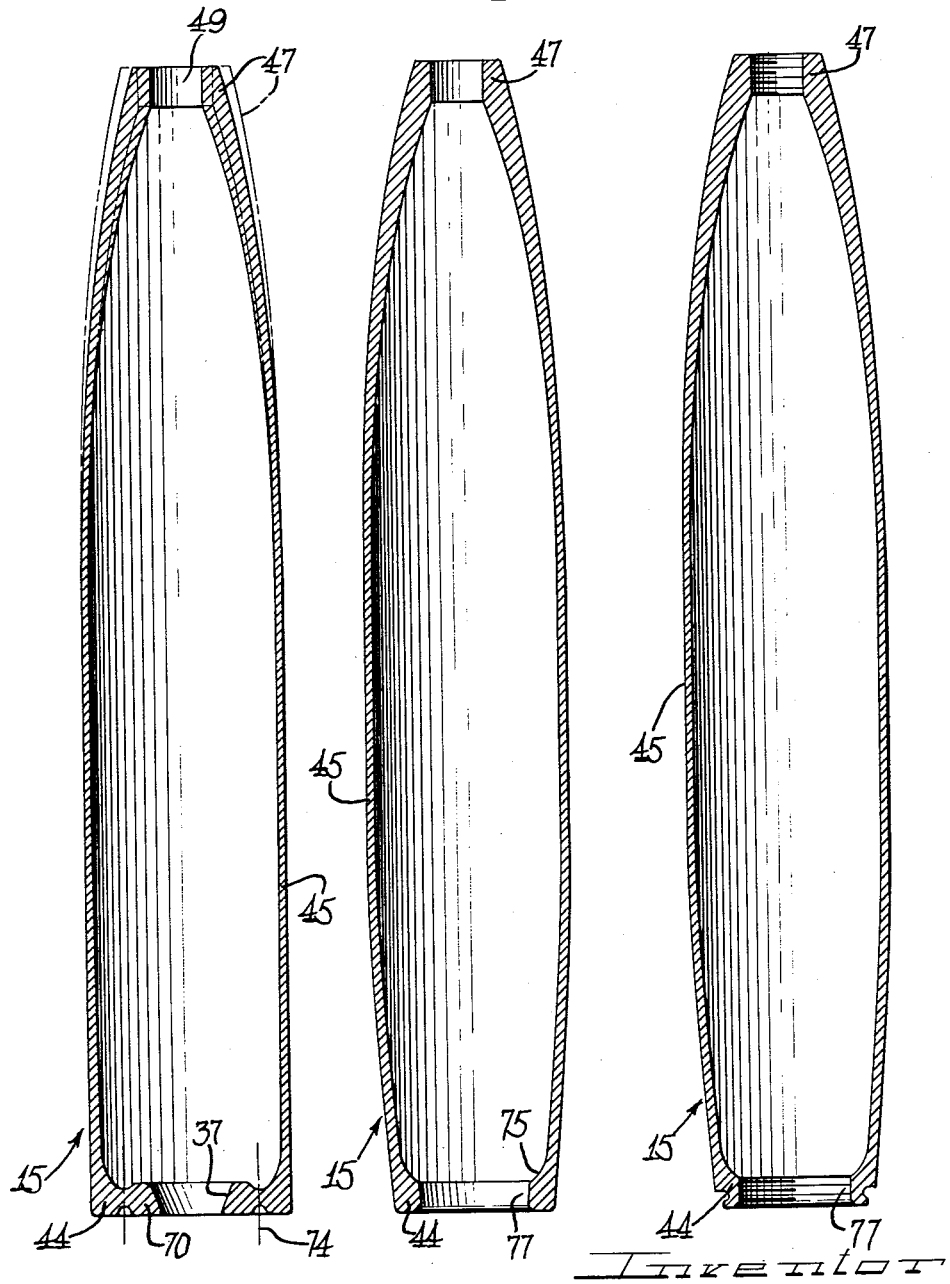

United States Patent Office 3,022,567
Patented Feb. 27, 1962

3,022,567
METHOD OF MAKING SHELLS
George Albert Lyon, Detroit, Mich., assignor to Lyon Incorporated, Detroit, Mich., a corporation of Delaware
Filed Apr. 26, 1955, Ser. No. 504,015
7 Claims. (Cl. 29—1.21)

The present invention relates to improvements in the making of shells, more particularly by cold working steel from a rolled slab or extruded blank by drawing and other cold working steps, and especially suitable for producing efficiently and economically large bomb head shells for what are generally referred to as low drag bombs.

Large size shells have usually been made by utilizing flat plate bent into cylindrical form and seamed along the meeting edges of the blank by welding, or drawn tubular stock has been used in suitable length cut from longer stock lengths of tubing. Such prior methods have had numerous disadvantages such as lack of structural or grain uniformity in the tubular blank, great difficulty in attaining or maintaining symmetry, especially in the finished shell, and inevitably high production costs.

A warhead shell for a low drag bomb of the 500 lb. size may be from 60 to 65 inches in length and 10 to 15 inches in outside diameter. Larger sizes of bomb, of course, require proportionately larger size warhead shells. Shells of this size require substantial mass of material in their production and proper distribution of the material for adequate strength where required in the shell structure, with nevertheless minimum mass consistent with strength to afford as light weight as possible in order to reduce the dead weight of a given bomb load, so as to take advantage of maximum load capacity in a bomber airplane and maximum travel distance to fuel ratio in a self-propelled type of bomb structure such as a guided missile. By the present invention, the attainment of these ends is satisfactorily accomplished.

It is accordingly an important object of the present invention to provide an improved method of producing shells, and more especially large size shells, by cold working steps.

Another object of the invention is to produce shells from soft, low carbon steel while attaining as the end result shells that are uniformly hard with a high yield strength.

A further object of the invention is to provide an improved method of making bomb head shells wherein not only is a uniformly work hardened thin tubular wall provided for the shell, but cooperatively and substantially uniformly work hardened thicker headed base end and taper nosed mouth end portions or areas are provided on the shell.

Yet another object of the invention is to provide an improved method of preparing a drawn shell for nosing.

A still further object of the invention is to provide an improved method of cold work hardening the thickened base of a drawn shell.

It is also an object of the invention to provide improvements in the heat treatment of cold worked steel shells during the conversion of the steel from the rough blank form into the finished shell.

Other objects, features and advantages of the present invention will be readily apparent from the following detailed description of a preferred embodiment thereof taken in conjunction with the accompanying drawings, in which:

FIGURE 2 is a vertical sectional view through the blank after it has been cupped preparatory for drawing;

FIGURE 3 is a vertical sectional view through the blank after the first draw;

FIGURE 4 is a vertical sectional view through the blank after the second draw;

FIGURE 5 is a vertical sectional view through the blank after the third draw;

FIGURE 6 is a vertical sectional view through the blank after the fourth draw and a mouth end restrike operation, and showing in fragmentary vertical section apparatus by which the fourth and final draw and mouth end restrike are accomplished;

FIGURE 7 is a vertical sectional view through the drawn shell showing the same after a cold heading operation, illustrated in association with the apparatus by which the heading is accomplished;

FIGURE 8 is a vertical sectional view through the shell after the heading operation and following a redrawing operation by which the mouth end is worked inwardly;

FIGURE 9 is a vertical sectional view through the shell, showing the same after a preliminary nosing operation;

FIGURE 10 is a vertical sectional view through the shell showing completion of the nosing and demonstrating the preliminary step in preparing the shell for back tapering;

FIGURE 11 is a vertical sectional view through the shell showing the same after back tapering; and FIGURE 12 is a vertical sectional view through the finished shell.

Figure 1:
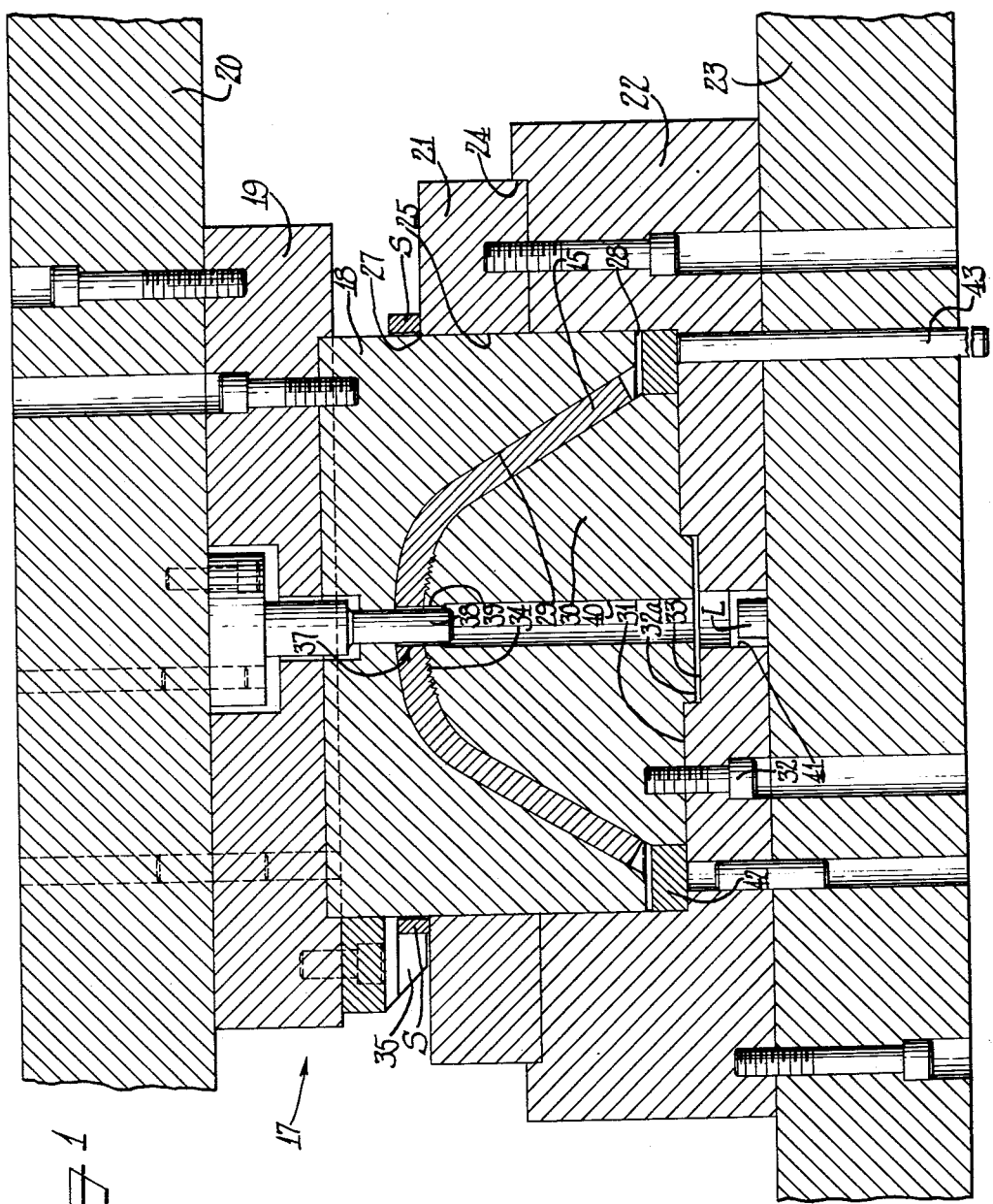
FIGURE 1 is a fragmentary vertical sectional view through trimming and dishing die apparatus showing a steel blank after it has been dished.

While various aspects of the present method are adaptable for medium soft steels, such as SAE 1030 steel, that is steel having a carbon content of between 0.28 and 0.34 percent, the method as it will be described has been especially adapted for use of soft carbon steel, satisfactory results having been obtained by using SAE 1010 steel having a carbon content of between 0.08 and 0.13 percent carbon by weight. Where hot rolled SAE 1010 steel slab is used having a grain size of about 7 and a hardness of about 65 on the Rockwell B scale, substantial manipulation of the material through dishing and cupping and initial drawing steps may be effected with only simple process annealing between manipulations, and without grain refinement.

For a 500 lb. bomb the warhead shell will be about 250 lbs. in weight and the cupped blank, before drawing will have a wall thickness of from ¾ to 1 inch. For a 1,000 lb. bomb size the cup wall thickness is from 1½ to 1¾ inches and the weight approximately 500 lbs. To attain a cup of proper size from a flat slab blank, a diameter of 25 to 30 inches is provided, while for the 1,000 lb. bomb size, a blank of from 35 to 50 inches is provided.

In order to accommodate a fairly large range of mill variables in the working characteristics of steel slab, preliminary dishing, and thereafter cupping with an intermediate annealing may be desirable. Accordingly, as the first step, a steel slab 15 (FIG. 1) may be dished cold in dishing die apparatus 17.

Since, as received from the mill, the slabs 15 of SAE 1010 steel are scaly and may have other impurities on the surface, the blanks are initially pickled to remove the scale and etch the surface, followed by appropriate rinsing. Then the blank is lubricated as by phoscoating. The blank is then ready for dishing without any preliminary heat treatment.

In the dishing die apparatus 17 of FIG. 1, trimming of the blank from a mill slab of polygonal outline is accomplished as well as dishing. To this end, the apparatus 17 includes a combination trimming and dishing punch 18 carried by a head plate 19 arranged to be secured removably to a ram 20. Prior to a trimming and dishing stroke, the punch 18 is supported by the ram 20 above and in clearance relation to a trimming shear ring 21 supported by a base member 22 removably secured to a ram member 23. For centering and stability against lateral displacement, the shear ring is seated within a complementary upwardly opening recess 24 in the top of the supporting member or block 22.

Prior to a trimming and dishing stroke of the punch 18, the polygonal blank or slab of steel is substantially centered upon the shear ring 21 over a circular central punch receiving opening 25 therein. At its upper inside corner, the shear ring 21 provides a shearing edge 27 which cooperates with a complementary lower outside circular shearing edge 28 on the lower nose end of the punch 18 so that as the punch is driven downwardly against the steel blank on the shear ring, scrap S is trimmed from the margin of the blank and remains upon the top of the shear ring 21 while the punch 18 moves on down through the punch clearance opening 25.

For uniformly bending the sheared blank 15 into dished form in the continuing stroke of the punch 18, a dishing cavity 29 is provided centrally within the punch 18 and opening downwardly to receive therein a complementary dishing dome 30 mounted within an upwardly opening recess 31 in the supporting block 22, the vertical wall of such recess being cylindrical and concentric with the shear ring recess 25 and of a diameter to receive the punch 18 freely therein. Means such as screws 32 may secure the dishing dome 30 concentrically within the recess 31. For concentricity and to hold the dishing dome 30 against transverse displacement, it is provided with a central depending centering boss 32a fitting snugly within a complementary centering depression or counterbore 33 in the bottom of the recess 31.

At its upper end or crown the dishing dome 30 is disposed in substantially the top plane of the shearing ring 21. Therefore, as the punch 18 drives down against the metal slab blank to trim the same, the pressure applied by the punch against the blank drives the blank tightly against the crown of the dishing dome 30. As the blank 15 bends down over the crown of the dome 30, an annular series of non-slip teeth, or serrations 34 on the crown of the dome bite into the material of the central portion of the blank and hold the blank against slipping or canting laterally as the dishing thereof progresses, with attendant pressures and stresses.

The stroke of the punch 18 continues until the blank 15 has been uniformly contracted and elongated into the dished form, resulting in a preferably rounded bottom and a flaring, in the present instance frusto-conical, side wall, with the bottom and side walls of the dish of uniform thickness and equal to the thickness of the original flat blank. At the end of the dishing stroke, the complementary surfaces of the dishing cavity 29 in the punch and of the dome cooperate to size the dished blank, that is to iron out any unequal or distorted portions of the dish and provide a uniform and symmetrical shape. This is of especial importance for cold working of the blank into the dished form.

In the final portion of the dishing stroke, the ring of scrap S lying upon the shearing ring 21 about the punch 18 is severed into a plurality of pieces by means such as depending knife edged scrap cutters or separators 35 secured to the head plate 19 about the base of the punch 18 and driving against the scrap toward the shear ring 21. There may be two or more of the cutters 35 as may be preferred.

In addition, near the end of the dishing stroke of the punch 18, a central aperture 37 is preferably punched in the base of the dished blank 15 in order to facilitate subsequent manipulations of the blank. Punching of the centering aperture 37 is accomplished herein by means of an aperturing punch 38 that projects down into the center of the dishing cavity 29 a limited distance to drive a slug L of material from the blank through a shearing aperture 39 in the crown of the dome 30. The punched-out slug drops down through a central bore 40 in the dishing dome 30 and is received in a clearance channel 41 in the bottom of the base block 22.

After completion of the dishing stroke of the punch 18, it is backed off and in view of the downwardly opening and flaring form of the dishing cavity 29, the dished blank 15 clears from the cavity and remains upon the dome 30. Assistance in clearing the dished blank 15 from within the recess 30 and the increased height of the recess as afforded by the central bore 25 in the shearing ring 21, is afforded by an elevating stripper ring 42 normally resting within the bottom of the recess 31 about the base of the dishing dome 30 in normally clearance relation below the lower margin of the dishing punch 18 at the end of the dishing stroke. Means for elevating the stripper ring 42 may comprise reciprocal elevator rods 43 reciprocally guided through the anvil 23 and the base block 22.

Following the dishing operation, the dished blank is process annealed at about 1250° F. and cooled in a 200° F. hot brine bath, followed by pickling and phoscoating. This prepares the blank for cupping, which is carried out in suitable cupping die including a female die member (not shown) within which is cooperable a cupping punch, the central base aperture 37 in the dished blank 15 serving to receive a pilot boss or pin at the end of the cupping punch. At the end of the cupping step, the blank will have the form shown in FIG. 2 including a dished bottom 44 and cylindrical slightly elongated tubular side wall 45. The thickness of the blank will still be approximately the same as in the original flat blank, and in any event the same as in the dished form of the blank.

Following the cupping operation, during which the blank is further subjected to cold working, the cupped blank is again process annealed at approximately 1250° F., quenched at 200° in hot brine, pickled and phoscoated.

The annealed, cupped blank 15 is next subjected to an initial or first draw wherein the internal and external diameters of the cylindrical side wall 45 are substantially reduced and the side wall elongated, as best seen in FIG. 3. During this draw, of course, the side wall 45 is subjected to substantial cold working. However, in view of the relatively coarse grain of the material up to this point, the length of the first draw must be controlled to be reasonably short and preferably only a fractional length greater than the length of the cup.

In order to prepare the blank for substantially increasingly greater drawing in length and reduction in diameter in a minimum of cold drawing strokes or passes, the blank is, after the first draw dual or isothermal annealed to refine the grain. This is accomplished by heating the blank uniformly to substantially above its critical temperature or $Ac_3$ point, a preferred temperature being about 1650° F. From this temperature the blank is rapidly cooled to about 1150° F., preferably in a salt bath, and held there for a period of four or five seconds to assure transformation to fine pearlite and ferrite. From the quenching bath, the blank may then be quickly cooled in 200° hot brine. Due to the fine grain and softness of the steel in the blank after such isothermal annealing, relatively severe, long cold drawing and working of the side wall 45 of the blank, and cold working of the base wall 44 can be accomplished. Furthermore, such drawing can be accomplished without intermediate annealing. In addition, without constantly repeating herein, it should be understood that before each cold working step, either drawing or coining or otherwise shaping, the blank or shell is appropriately pickled and lubricated as by phoscoating.

After the grain refinement, the blank 15 is subjected to a second draw in which the tubular wall 45 is substantially elongated, such as on the order of double its first draw length, and further substantially reduced in both internal and external diameter. In this second draw (FIG. 4) substantially the final inside diameter of the shell is provided.

In a third draw (FIG. 5) the tubular side wall 45 is reduced in external diameter and elongated, while at the mouth end a section of limited length remains free from reduction in diameter to provide an annular external mouth collar 47 with a tapered external surface 48 to juncture with the cylindrical portion of the wall 45.

In a fourth and final elongation and wall thickness reducing draw (FIG. 6) the side wall 45 is further substantially elongated and reduced to the final outside diameter, with substantial elongation of the tapered surface 48, and a final shaping of the collar 47 to provide the same with an internal flaring mouth taper 49. This is accomplished in a drawing and restrike punch and die assembly 50. This includes an elongated drawing punch 51 and a drawing die 52 through which the punch drives the partially drawn shell 15 to further elongate the side wall 45 thereof and reduce the thickness thereof to the final outside diameter. In the upper portion of the bore of the drawing die it is flaringly tapered as shown at 53 in order to facilitate the drawing operation and in the last portion of the stroke of the punch 51 to serve as a restrike surface to fix the bevel of the surface 48 adjacent the shell mouth. In addition, the upper mouth end portion of the die bore is provided with an annular preferably generally cylindrical collar forming counterbore portion 54 which is cooperable with a generally frustoconically flared restrike shoulder 55 on the upper end portion of the punch. In the final portion of the stroke of the punch 51, the punch shoulder 55 acts to restrike the mouth end collar 47 to work the same into the outwardly flared, radially outwardly annularly prominently thickened form as shown in FIG. 6.

Upon completion of the fourth draw and mouth restrike of the shell 15, cold working of the tubular side wall 45 through the several drawing passes will have effected hardening of the wall to substantially martensitic hardness. At the same time, of course, the thickened mouth end portion of the shell, including the collar 47 has been somewhat hardened by cold working, but not to the same extent as the thin wall section of the tubular wall 45. Since the base wall 44 up to this point has received no working, it remains in the fine grain soft pearlitic state.

After it has completed its stroke, the punch 51 is backed off and a stripping plunger 57 ejects the shell 15 upwardly from the die member 52.

In the next operation upon the shell 15, the base wall 44 is headed. This is accomplished by means of a heading die assembly 58 (FIG. 7). To this end, a heading plunger or punch 59 carried by a reciprocable ram 60 is engageable within the shell 15, while a die structure including a die block 61 provided with a bore 62 receives the base end portion of the shell. By preference the punch 59 includes a plurality of separable, stacked cylindrical shank blocks 63 of smaller outside diameter than the inside diameter of the shell wall 45 and held in assembly with the ram 60 by means of a centrally extending bolt 64 which at its threaded extremity is secured into a heading terminal block 65. Mounted within a central downwardly opening recess 67 in the tip end of the hardened heading block 65 is a hardened taper nosed heading nipple 68 adapted when the heading punch is driven into the shell and toward a heading die block 69 in the lower end of the die bore 62 to project into and enlarge the base wall perforation or opening 37 of the shell by radially outwardly displacing the material of the base wall.

Cold working of the shell base wall 44 by the heading effected between the heading punch block 65 and the die block 69, with the heading nipple 68 cooperating therewith, redistributes the material of the base wall 44 into an annular mass of substantial cross section in line with the side wall 45 of the shell and a central annular thickened portion 70 that has the central opening 37 thereof substantially enlarged and tapered conformable to the heading nipple 68. Between and connecting the thickened annular portions of the base wall is a circular thin portion from which material has been displaced into the annular thickened portions by cooperative action of opposing annular forming ribs 71 and 72 on respectively the nose end of the heading block 65 and on the heading end portion of the heading die 69. For accommodating the tip portion of the heading nipple 68 a clearance recess 73 is provided in the central portion of the die member 69.

While heading of the base wall 44 as described hardens the material to a certain extent, the hardness thereof will not, of course, be as great as that of the cold worked drawn side wall 45.

Following the heading operation, the heading punch assembly 59 is backed off from the die assembly 58 and the die member 69 is movable upwardly through the die bore 62 for stripping the headed shell from the die.

Then, the mouth end of the shell is redrawn, as shown in FIG. 8. In this operation the thickened collar portion 47 is worked toward the inside diameter of the shell and the outside diameter of the mouth portion is brought into the cylindrical circumference of the remainder of the shell wall 45, thereby preparing the shell for nosing. Since this redraw operation effects further substantial cold working of the material in the thickened mouth collar and contiguous tapering portion of the mouth end of the shell wall, this portion is process annealed in preparation for the nosing operation. Such annealing is limited, however, to the mouth portion that is to be annealed, that is, approximately ⅙ of the way down from the mouth tip of the shell so as to leave the remainder of the shell wall 45 in the high compression strength condition to which it has been brought by the cold work drawing thereof.

Nosing of the shell 15 is carried out in a plurality of steps as depicted in FIGS. 9 and 10. After the first nosing as shown in full line in FIG. 9 and in dot dash outline in FIG. 10, the nose end portion is process annealed and then subjected to a second nosing operation wherein the nose is tapered to the form of ogive shown in full outline in FIG. 10 and in dot dash outline in FIG. 9. As a result of the final nosing operation, the nose portion attains substantially the same hardness as the wall portion 45.

Before or after the nosing operation, the annular central thickened head portion 70 of the shell is parted from the head of the shell along a severance line 74 through the thinner connecting portion of the head. This leaves the head end of the shell with an annular internal collar of substantial thickness joined to the wall 45 on a substantial fillet 75 and with an enlarged opening 77 through the bottom of the shell.

With the mass of the shell head substantially reduced by removal of the piece 70, back tapering of the shell is effected as shown in FIG. 11. Since this back tapering effects only a moderate reduction in diameter of the head end of the shell, and the material of the base 44 remaining in the headed shell is still of only moderate hardness from the cold working during heading, the back tapering can be accomplished, if desired, without prior annealing. At the end of the back tapering operation, the cold working to which the head end of the shell has now been subjected, assures that the head end will be of substantially the same hardness as the remainder of the shell.

Following back tapering of the shell, the nose and the head end are internally machined and threaded to receive respective components of a bomb assembly with which the head shell is to provide a component. It might also be pointed out that in the interim, the ring shaped piece 70 removed from the shell head may have been machined to be reassembled with the internally threaded shell head.

Following the machining of the ends of the shell, the entire shell may be subjected to stress relief in a salt bath at approximately 650° to 700° F. in order to have the entire shell of reasonably uniform cold worked hardness.

It is desirable at some time in the fabrication of the head shell 15 to provide the same with hanger sockets in an intermediate portion of the shell wall 45. The method by which such sockets are to be provided will determine at which stage in the fabrication of the shell they are to be associated with the shell wall. For example, the hanger sockets may be applied when the shell is in the back tapered condition shown in FIG. 11. On the other hand, if supplying of the sockets is to be accomplished according to the method disclosed, by way of example, in my Patent No. 2,822,461, issued February 4, 1958, supplying of such sockets may have to be done at an earlier stage in the fabrication of the shell such as before or after the redraw of the mouth as depicted in FIG. 8. In such event, the parting of the central ring portion 70 of the head of the shell may have to be done before the nosing of the shell so as to afford entrance clearance through the head end of the shell for apparatus involved in the welding or cold riveting of the hanger sockets or other operations or machining.

The completed bomb head shell including the thin side wall 45 which is hardened by drawing to the thin section thereof, and the tapered nose which is hardened incident to the thickening and displacement of the material in the nose portion of the shell, and the cold headed and work hardened head end of the shell, are all substantially uniformly of a hardness in the range of 95 to 100 Rockwell B, approaching that of spring steel, although starting with a steel of only about 65 Rockwell B. Therefore, the shell will have a high yield strength of around 100,000 p.s.i., well above 70,000 p.s.i., requisite for bomb heads.

It will be understood that modifications and variations may be effected without departing from the scope of the novel concepts of the present invention.

I claim as my invention:

1. In a method especially adapted for making a large size shell from a low carbon steel cup on the order of SAE 1010 steel, which comprises preliminary drawing of the tubular wall of the cup to elongate and reduce the diameter thereof, heat treating the thus drawn cup to change the grain structure to fine pearlite, and thereafter substantially further elongating and reducing the diameter of said tubular wall by cold working the same and by cold work coining the base of the shell, as well as cold work nosing the mouth end of the shell to impart to the entire shell work hardness of substantially martensitic steel.

2. In a method of making high yield strength shells from low carbon steel, the steps of process annealing a steel cup, drawing the tubular wall of the cup into preliminary elongation and reduction in diameter, isothermal annealing the partially drawn cup to refine the grain structure thereof to fine pearlite, and thereafter in a plurality of successive draws substantially elongating and reducing the diameter and section of the tubular wall of the shell without further annealing to produce a final wall hardness on the order of martensitic spring steel.

3. In a method of making steel shells from low carbon steel, the steps of drawing a steel cup into elongated thin wall shell form, shaping the mouth end of the shell with a laterally projecting thickened collar, cold work heading the base wall portion of the shell, redrawing the mouth end portion of the shell to work the thickened collar to the interior of the mouth end of the shell, and cold work nosing the mouth end of the shell, whereby the entire shell including the side wall, the base wall, and the nose portion are cold work hardened.

4. In a method of making a shell from low carbon steel, the steps of drawing the tubular wall of a steel cup into elongated shell form, externally thickening the mouth end portion of the shell wall, restriking the thickened shell wall mouth to cold work the same and provide an internal taper thereto, and reworking the mouth portion of the shell by contracting the mouth end portion and internally thickening the mouth end portion of the shell.

5. In a method of making shells, the steps of trimming and dishing a metal slab blank, process annealing the blank, cupping the blank, process annealing the cupped blank, drawing the tubular wall of the blank to elongate and reduce the diameter thereof, isothermal annealing the drawn cupped blank to refine the grain thereof, and thereafter successively elongating and reducing the diameter and section of the tubular wall of the shell without further annealing and by cold working the same to substantial hardness.

6. In a method of making work hardened shells, including cold drawing an elongated tubular thin wall shell into substantially hardened condition, incident to such drawing shaping a thickened externally projecting mouth end collar on the shell wall, and cold work hardening said mouth end collar portion by cold restriking the same internally and thereafter forcing the collar material inwardly into contracted cold work hardened condition.

7. In a method of cold work hardening the base of metal shells having an elongated thin shell wall and a thickened bottom portion with a perforation in the center of the bottom, including cold working said bottom by simultaneously coining the bottom and displacing the metal of the bottom radially outwardly by enlarging the perforation.

References Cited in the file of this patent

UNITED STATES PATENTS

| | | |
|---|---|---|
| 1,451,998 | Neubauer | Apr. 17, 1923 |
| 1,513,644 | Sindelar | Oct. 28, 1924 |
| 1,773,741 | McNiff | Aug. 26, 1930 |
| 2,220,652 | Ormann | Nov. 5, 1940 |
| 2,360,354 | Lyon | Oct. 17, 1944 |
| 2,394,883 | Whipple | Feb. 12, 1946 |
| 2,442,841 | Catlin et al. | June 8, 1948 |
| 2,528,577 | Catlin et al. | Nov. 7, 1950 |
| 2,539,807 | Brandes | Jan. 30, 1951 |
| 2,642,647 | Culhane | June 23, 1953 |
| 2,654,942 | May | Oct. 13, 1953 |
| 2,683,999 | Hammond | July 20, 1954 |
| 2,698,268 | Lyon | Dec. 28, 1954 |
| 2,700,906 | Allen | Feb. 1, 1955 |
| 2,772,470 | Lyon | Dec. 4, 1956 |

OTHER REFERENCES

Brown: "Cold Extrusion of Shells Saves Steel," Iron Age, published October 19, 1950.